July 17, 1962     S. F. PEARLMAN ETAL     3,044,621
NUT MEAT CLEANER
Filed Aug. 6, 1958
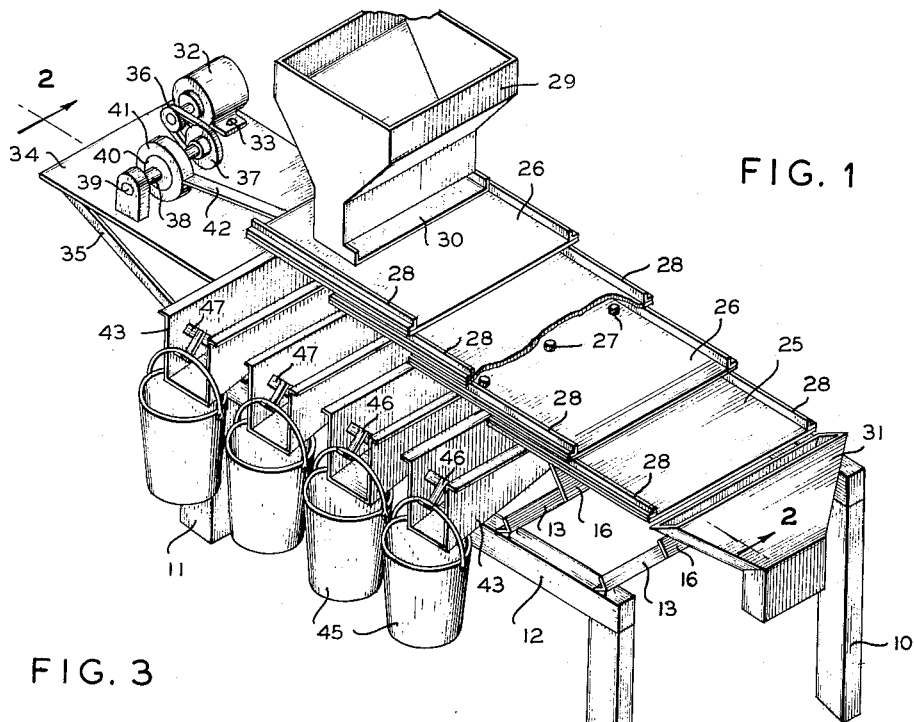
FIG. 1
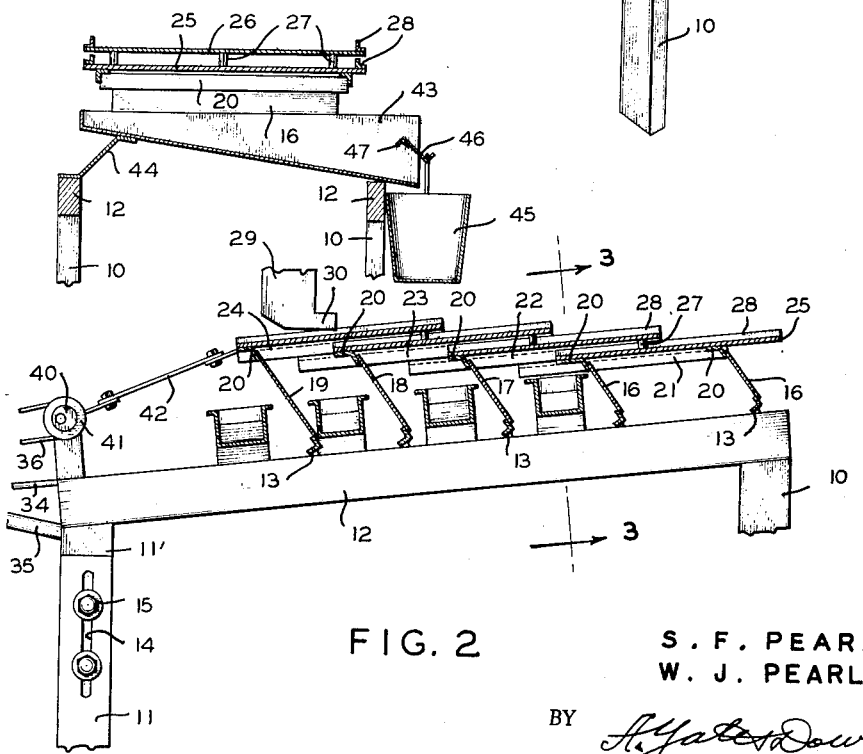
FIG. 3
FIG. 2
INVENTORS
S. F. PEARLMAN
W. J. PEARLMAN
BY *H. Yates Dowell*
ATTORNEY United States Patent Office 3,044,621
Patented July 17, 1962

3,044,621
NUT MEAT CLEANER
Sidney F. Pearlman and William J. Pearlman, both of P.O. Box 97, Valdosta, Ga.
Filed Aug. 6, 1958, Ser. No. 753,478
3 Claims. (Cl. 209—112)

This invention relates to the production and preparation for use of comestibles including the obtaining of the fruits of various earth grown products and to the readying of the same for human consumption and enjoyment and the nourishment of the body.

The invention likewise relates to equipment employed in the collection and preparation of foods, the separation of undesirable from desirable foods and to equipment used including for obtaining pecans and other substances from undesirable and waste portions thereof.

In some areas certain nuts are infested with the grub or worm of pecan weevils. This worm grows to a size of about 3/8" long and about 1/4" in diameter. It is of a color and shape so nearly like that of a broken piece of a pecan that it is extremely difficult to disinguish therefrom. In the shelling of pecans these worms because of their size are collected with the midget, small, and medium pieces of shelled pecans. The only method of removing them has been by passing them over an inspection table or belt but because of the fact that the worms so nearly resembled the pecan pieces, it has been hard to detect and remove the worms it having been necessary on occasion to subject the nut meats to seven or eight inspections and even then with the probability that all the worms were not removed. Due to the fact that these inspections involved an expense of approximately two to three cents per pound, the expense of inspection and the cost of the nut meats has been excessive and undesirable.

It is an object of the invention to provide a machine for separating undesirable and inedible substances from nut meats; by which the operation of obtaining and inspecting nut meats can be accomplished at small cost and more satisfactorily; and a machine capable of being adjusted to accommodate nut kernels of different sizes, thereby more effectively to accomplish the desired results.

Another object of the invention is to provide a separating machine which can be easily produced from readily available materials at relatively low cost and which will effect a substantial saving of labor and give the sheller a more nearly perfect product devoid of foreign matter.

Other objects and advantages of the invention will be apparent from the following description taken in conjunction with the accompanying drawing wherein:

FIG. 1 is a perspective illustrating one application of the invention;

FIG. 2, a longitudinal section on the line 2—2 of FIG. 1; and

FIG. 3, a transverse section on the line 3—3 of FIG. 2.

Briefly stated, the invention comprises a frame on which are mounted a hopper for the reception of shelled nut meats from which worms are to be separated, a series of trays or plates in stepped or terraced relation with an opening or space therebetween, and a frame carrying the plates and mounted on flexible spring supports which allow the frame to reciprocate causing vibration. An eccentric is employed to produce the vibrating reciprocation, such eccentric being driven through gearing from a source of power such as an electric motor.

The frame with the trays or plates is set at a slight angle so that when it is moved back and forth and vibrated at a rapid rate the movement will cause angular nut meats and objects other than the round and oval ones to move forwards on the trays or plates. Because of the slight forward inclination of the plates the round and oval shapes including the worms and other material will not move forwardly on the trays or plates but instead will roll back down and off the smooth imperforate plates through the open spaces therebetween. These round and oval objects including worms fall into chutes disposed transversely beneath the rear ends of the trays or plates. The inclination of the trays or plates and the speed of reciprocation and vibration causes the material to jump and bounce while travelling on the trays or plates. This helps the round and oval objects including worms to be separated from the nut meats and be removed by falling from the rear edges of the trays or plates.

With continued reference to the drawing, the present invention includes a pair of front legs 10 and rear legs 11 on which are supported parallel side bars 12 across which are mounted a series of spaced members 13. The legs 10 and 11, parallel bars 12 and members 13 may be composed of metal channels or the like.

The rear legs 11 are adjustable in length and have their upper ends provided with slots 14 in which are slideably received bolts and nuts 15 carried by an upper leg portion 11' attached to the parallel bar 12. This structure allows variation in angularity or inclination of the bars 12 which form a part of the supporting frame structure of the machine.

Flexible plates 16, 17, 18 and 19 have their lower ends connected to the angular cross members 13 and their upper ends connected to additional angle members 20 which connect parallel bars 21, 22, 23 and 24 disposed at a slight angle and welded or otherwise secured in fixed position. On the bars are mounted relatively smooth imperforate trays or plates 25 and 26. The two spring plates 16 are located in longitudinally spaced relation and form a support for the parallel side members 21 and the tray or plate 25.

Additional trays or plates 26 are supported along the machine in parallel upwardly stepped or terraced relation with the plates 26 having three supports 27 resting on the plates 25 and 26 with the sides of the plates 25 and 26 carrying the angle members 28 which retain the contents of the plate against discharge from the sides.

A hopper 29 is disposed above the first plate 26 so that the discharge 30 will direct nut meats or other angular material from the hopper centrally onto the first plate or tray 26 from which the material will be caused to travel forwardly to the next successive tray 26 until finally it reaches and is discharged from the last plate or tray 25 through a discharge chute 31 at the front or discharge end of the machine. When the nut meat and other material is discharged from the hopper any round meat or worms will be caused by gravity to roll downwardly and be discharged from the rear edge of the tray.

The trays 25 and 26 are moved or reciprocated lengthwise of the machine a limited amount by means of an electric motor 32 or other source of power mounted by means of fasteners 33 on a platform 34 supported by braces 35. The motor drives a belt 36 and a pulley 37 on a shaft 38 mounted in bearings 39, the shaft 38 being provided with an eccentric 40 located within a collar 41 attached to a three-part bar 42, the remote end of which is connected to the angle member 20 beneath the first plate 26.

The reciprocation of the bar 42 by means of eccentric 40 will produce reciprocation of the several trays causing bodies of irregular shape to progress and be discharged toward the front of the machine while smooth substantially round bodies will roll and be discharged from the rear edge of the tray into inclined transverse troughs 43 supported on the longitudinal frame members 12 but spaced from such members on one side by means of a bracket 44. The inclined bottoms of the discharge chutes 43 cause discharge toward the lower ends into buckets or other receptacles 45 mounted on hangers 46 carried by a transverse angle brace 47 anchored to both sides of the discharge chute.

In the operation of the device, nut meats containing some undesirable and inedible substances such as small worms are discharged from a hopper 29 onto the first of a series of spaced trays which are slightly inclined from the rear to the front of such trays. The trays are mounted on flexible plates and are caused to vibrate by an arm 42 mounted on an eccentric 40 driven by an electric motor 32. As the trays vibrate, the generally round or oval undesirable worms will roll by gravity to the lower edge of the trays and be discharged through troughs 43 into receptacles 45. The angular nut meats will move up the slight incline and fall by gravity to the next successive tray. Most of the worms which were prevented from rolling by pieces of nut meat on the first tray will be released by the fall and will roll to the lower edge of the second tray and be discharged therefrom. Subsequent fall and separating will remove all of the worms from the angular nut meats and the nut meats will be discharged through a chute 31.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A machine for separating nut meats from foreign matter comprising frame structure, a series of trays mounted on said frame structure and inclined relative to the length thereof, flexible tray supporting means mounting said trays on said frame structure, said trays being in overlapping generally parallel spaced relation to each other, a hopper for nut meats located above the machine in a manner to supply nut meats onto the first of said trays, a chute for the discharge of nut meats from the machine, transverse chutes beneath the lower edges of the inclined trays, and power driven means connected to said trays for shaking the same whereby round and oval objects will roll by gravity down the incline of the trays and angular objects will be projected up the incline and discharged from the upper portion of one tray onto the next tray where round and oval objects entrapped by nut meats on the first tray will roll by gravity down the incline of the next tray and subsequently angular pieces of nut meat substantially free of foreign matter will be discharged from the machine, said flexible tray supporting means supporting the lowermost tray and the other trays have a portion supported upon the preceding tray and another portion supported by said tray supporting means.

2. Apparatus for separating nut meats or other bodies having generally flat portions from foreign matter having portions with rounded surfaces comprising a series of inclined trays arranged in stepped relation with the first of the series lower than the last of the series, means for shaking the trays simultaneously to cause the nut meats with the flat surface portions to travel up the incline of the trays and foreign matter with rounded portions to roll from the lower edges of the trays, means for collecting the discharge from the lower edge of each of the trays and from the remote end of the uppermost tray, supporting structure for said trays of a character to yield to permit the shaking of the trays with at least one of the trays having a portion supporting an adjacent tray.

3. Apparatus for separating nut meats from foreign matter comprising frame structure, a series of trays mounted on said frame structure and inclined relative to its length, yieldable tray supporting means mounting said trays on said frame structure in generally parallel overlapping relation, the arrangement being such that means is provided whereby objects discharged from the upper portions of all of the trays except the last tray will be deposited on the lower portion of the next tray, and the discharge from the last tray will be from the apparatus, a hopper for nut meats or other matter to be separated located above the trays in a manner to discharge onto the first of the trays, means whereby said trays may be shaken, and transverse chutes beneath the lower edges of the trays.

References Cited in the file of this patent

UNITED STATES PATENTS

| 218,380 | Granniss | Aug. 12, 1879 |
| 291,123 | Ziegler | Jan. 1, 1884 |
| 743,752 | Read | Nov. 10, 1903 |
| 1,368,746 | Palmer | Feb. 15, 1921 |
| 1,415,610 | Palmer | May 9, 1922 |

FOREIGN PATENTS

| 623,536 | Great Britain | May 19, 1949 |